United States Patent
Albou et al.

(10) Patent No.: US 10,077,879 B2
(45) Date of Patent: Sep. 18, 2018

(54) VEHICLE HEADLAMP SYSTEM

(71) Applicant: Valeo Vision, Bobigny (FR)

(72) Inventors: Pierre Albou, Paris (FR); Vanesa Sanchez, Bois Colombes (FR); Arzu Aslan, Pantin (FR)

(73) Assignee: VALEO VISION, Bobigny (FR)

( * ) Notice: Subject to any disclaimer, the term of this patent is extended or adjusted under 35 U.S.C. 154(b) by 216 days.

(21) Appl. No.: 14/908,243

(22) PCT Filed: Jul. 28, 2014

(86) PCT No.: PCT/EP2014/066177
§ 371 (c)(1),
(2) Date: Jan. 28, 2016

(87) PCT Pub. No.: WO2015/014793
PCT Pub. Date: Feb. 5, 2015

(65) Prior Publication Data
US 2016/0161077 A1 Jun. 9, 2016

(30) Foreign Application Priority Data
Aug. 2, 2013 (FR) .................................. 13 57746

(51) Int. Cl.
*B60Q 1/04* (2006.01)
*F21S 8/10* (2006.01)
(Continued)

(52) U.S. Cl.
CPC .......... *F21S 48/1747* (2013.01); *B60Q 1/143* (2013.01); *F21S 41/147* (2018.01);
(Continued)

(58) Field of Classification Search
CPC . B60Q 1/64; B60Q 1/08; B60Q 1/085; B60Q 1/16; B60Q 1/04; F21V 13/04; F21S 48/10; F21S 48/10
See application file for complete search history.

(56) References Cited

U.S. PATENT DOCUMENTS 8,573,819 B2 11/2013 Okubo et al.
2012/0051071 A1 3/2012 Okubo et al.

FOREIGN PATENT DOCUMENTS

EP 2060442 A2 5/2009
EP 2415638 A2 2/2012
(Continued)

*Primary Examiner* — Ismael Negron
(74) *Attorney, Agent, or Firm* — Oblon, McClelland, Maier & Neustadt, L.L.P.

(57) ABSTRACT

A lighting system includes a first projector to project a first beam and a second projector to project a second beam, the first and second beams being combined to create a total beam. Each of the first and second beams comprises at least one light bundle, each of the at least one light bundle comprising a plurality of elementary bundles, each comprising a first and a second cut-off edge, and each extending substantially in a quarter plane delimited by said first and said second cut-off edges. The plurality of elementary bundles of a same light bundle partially overlapping and arranged with respect to one another along a same orientation, so that their first cut-off edges are substantially aligned along a substantially horizontal direction and their second cut-off edges are offset angularly in pairs by a first interval along said substantially horizontal direction.

21 Claims, 4 Drawing Sheets

(51) Int. Cl.
*B60Q 1/14* (2006.01)
*F21S 41/147* (2018.01)
*F21S 41/663* (2018.01)
*F21S 41/675* (2018.01)

(52) U.S. Cl.
CPC .......... *F21S 41/663* (2018.01); *F21S 41/675* (2018.01); *B60Q 2300/056* (2013.01)

(56) References Cited

FOREIGN PATENT DOCUMENTS

| | | |
|---|---|---|
| EP | 2423567 A2 | 2/2012 |
| EP | 2436968 A1 | 4/2012 |
| EP | 2597360 A1 | 5/2013 |
| EP | 2607165 A1 | 6/2013 |
| JP | 2013107590 A | 6/2013 |

VEHICLE HEADLAMP SYSTEM

CROSS-REFERENCE TO RELATED APPLICATIONS

This application is the U.S. National Phase application of PCT Application No. PCT/EP2014/066177 filed Jul. 28, 2014, which claims priority to the French application 1357746 filed on Aug. 2, 2013, which applications are incorporated herein by reference and made a part hereof.

BACKGROUND OF THE INVENTION

1. Field of the Invention

The present invention relates in a general way to the generation of light beams, notably for motor vehicles.

2. Description of the Related Art

In this field, there are known lighting modules or projectors, which conventionally include:

dipped headlights, or low beam lights, with a range on the road of about 70 meters, which are essentially used at night, and in which the distribution of the light beam is such that it avoids dazzling the driver of an oncoming vehicle. Typically, the cross section of the upper part of this beam has a horizontal portion, preferably about 0.57 degrees below the horizon, to avoid lighting the area in which the driver of an oncoming vehicle is likely to be present;

long-range high beam lights, with a range on the road of up to 600 meters, which must be extinguished when encountering or following another vehicle, to avoid dazzling its driver;

and fog lights.

More recently, partial lighting modes have been developed, in which a selective beam is formed, having dark areas in the locations of vehicles or persons that must not be dazzled. The road lighting is improved relative to low beam lights alone, while the annoyance of excessive brightness for oncoming or followed drivers is avoided, whereas this annoyance would be created by conventional long-range high beam lights, for example. A selective lighting function of this type is also called an ADB ("Adaptive Driving Beam").

Various solutions have been considered for forming a beam of the ADB type.

Notably, the document EP 2 415 638 filed by the present applicant discloses a set of two optical units, each being capable of forming a complementary beam producing, in a plane perpendicular to the optical axis of the complementary beam, a lighting area in the shape of a "ship's sail", that is to say an area having first and second cut-off edges which substantially form a right angle between them, and extending for the most part in a quarter plane delimited by the two cut-off edges. The set of two optical units is arranged to generate a non-dazzling area in a light beam, the area being delimited on either side by the respective complementary beams of the optical units. A drawback of this solution is that an orientation mechanism has to be provided for each optical unit in order to be able to move the non-dazzling area and/or to modify the width of this area, to follow the movement of a third-party vehicle whose dazzling is to be prevented. These orientation mechanisms are costly, bulky, and may give rise to problems of reliability.

Another solution described in the document EP 2 060 442, also filed by the present applicant, is to create a complementary beam composed of a plurality of elementary bundles which are partially overlapping, each elementary bundle being limited on its inner side by a substantially vertical cut-off edge (the shape of the elementary bundles being described as a "half-moon"), and the elementary bundles being arranged so that the cut-off edges of the various elementary bundles are offset angularly in the direction away from the optical axis. A light source is associated with each elementary bundle and a control means is provided to switch each elementary bundle on or off in a selective manner, according to the traffic conditions, in order to create a non-illuminated strip which can lie between two illuminated areas. Thus it is possible to vary the size and/or the angular position of the non-illuminated strip, solely by switching the light sources on and/or off, without the need for any orientation mechanism. However, the fact that the elementary bundles have a half-moon shape gives rise to problems. Thus, when the ADB function is activated, that is to say when a strip is switched off according to the principles of the document EP 2 060 442, this creates variations of intensity below the horizontal, and in particular below the horizontal cut-off of the low beam, which is not only useless, since this area placed below the horizontal cut-off is not a critical area for the third-party vehicle, but may prove to be annoying;

when the ADB is not activated, but the complementary beam to the low beam is switched on for a high beam function, the resulting overall beam is not uniform. In particular, also because of the half-moon shape of the elementary bundles which partially overlap each other, and which also overlap the low beam below the horizontal cut-off, the total resulting ground illumination is too great.

Furthermore, none of the preceding solutions makes it possible to obtain a uniform high beam regardless of the distance in front of the vehicle at which it is placed.

SUMMARY OF THE INVENTION

The object of the present invention is to propose solutions for improvement in terms of uniformity, in respect of the generation of a beam complementary to a low beam for an ADB functionality and/or a high beam functionality.

Thus a first object of the invention relates to a lighting system, notably for a motor vehicle, comprising a first projector capable of projecting a first light beam and a second projector capable of projecting a second light beam, the first and second light beams being combined with each other to create a total beam on either side of an optical axis, wherein:

each first and second beam produces, in a plane perpendicular to the optical axis, at least one primary light bundle;

each primary light bundle comprises a plurality of primary elementary bundles, each comprising a first and second cut-off edge, and each extending for the most part in a quarter plane delimited by the first and the second cut-off edges;

the primary elementary bundles of the same primary light bundle being partially overlapped and arranged with respect to one another in the same orientation, so that their first cut-off edges are substantially aligned along a substantially horizontal direction and their second cut-off edges are offset angularly in pairs by a first interval along the substantially horizontal direction;

each primary elementary bundle of the first light beam being positioned in an inverted orientation relative to a primary elementary bundle of the second light beam, so that the first cut-off edges of the primary elementary bundles of the first light beam and of the primary elementary bundles of the second light beam are substantially aligned along the substantially horizontal direction, and the second cut-off edges of the primary elementary bundles of the first light beam and of the second light beam are offset angularly in pairs by a second interval, smaller than the first interval, along the substantially horizontal direction;

each primary elementary bundle of the first and second light beams being generated by a light source which can be switched on or off selectively.

Because of this system, there is no longer any light spreading below the horizontal cut-off, particularly on the ground, when the system is used in high beam mode, nor any dark strip below the horizontal cut-off when the system is used in the ADB function. Furthermore, the accuracy of the ADB function is improved, since the resulting non-illuminated strips have a minimum width corresponding to the second interval.

According to other, additional characteristics:

each first and second light beam can advantageously also produce, in the plane perpendicular to the optical axis, a secondary light bundle similar to the primary light bundle, but having secondary elementary bundles which extend, in the same beam, in an orientation opposed to that of the primary light bundle. Each secondary elementary bundle of the first and second light beam respectively is preferably positioned in an inverted orientation relative to a primary elementary bundle of the first and second light beam respectively, so that their first cut-off edges are substantially aligned along the substantially horizontal direction, and their second cut-off edges are substantially aligned along a substantially vertical direction. As a result of this arrangement, the beams obtained at each projector, as well as the overall beam when all the light sources are switched on (for the high beam function), are very uniform, regardless of the distance at which the user is located;

the second interval is, for example, substantially equal to half of the first interval, that is to say 1.5 degrees if the first interval is set at 3 degrees;

by way of example, each elementary bundle can be produced by an optical device comprising a reflector arranged to generate a reflected light beam based on light rays emitted by the light source associated with the elementary bundle, and a shield wall having a boundary located on the path of the reflected light beam and configured to form the second cut-off edge to generate the first cut-off edge. The shield wall is preferably reflective, enabling the light output to be improved. The reflector preferably has a substantially elliptical horizontal cross section, and the associated light source is placed in the plane of the shield wall at a first focus of the substantially elliptical horizontal cross section;

in a variant, each elementary bundle can be produced by a light-emitting device comprising a reflector, preferably of ellipsoid shape, a shield surface arranged to create cut-off with a substantially vertical direction in the light beam generated by the light-emitting device, another shield surface arranged to create a cut-off with a substantially horizontal direction in the light beam generated by the light-emitting device, and an optical element, typically a lens, comprising a first focus and/or a first focal line located at the intersection of the cut-off edges of the two shields, and receiving the light reflected by the reflector;

according to another variant, each elementary bundle can be produced by an optical unit comprising a reflector capable of producing the two substantially orthogonal cut-off edges by direct imaging of the light source, that is to say by aligning the images of the light source formed at each point of the reflector;

the elementary bundles of the same light bundle can either be substantially of the same size, or have an angular extension, in the horizontal direction, which is variable according to their position in the light bundle. In particular, the angular extension of the elementary bundles of the same light bundle preferably increases with the distance between the first vertical cut-off edge associated with each elementary bundle and the vertical cut-off edge of the same the light bundle when all the associated light sources are switched on;

the total beam produced is a beam complementary to a cut-off beam to provide a high beam;

the light sources are light-emitting diodes;

the primary light bundle of the first beam extends for the most part on a first side of the optical axis, and the primary light bundle of the second beam extends for the most part on a second side of the optical axis opposite the first side;

the first and second cut-off edges of each elementary bundle form an angle substantially in the range from 70° to 110°, preferably a right angle.

The invention also proposes a lighting projector, notably for a motor vehicle, capable of projecting a light beam, the light beam producing, in a plane perpendicular to the optical axis, at least a primary light bundle comprising a plurality of primary elementary bundles, each primary elementary bundle being generated by a light source which can be switched on or off selectively, characterized in that each primary elementary bundle comprises a first and a second cut-off edge, and extends for the most part in a quarter plane delimited by the first and second cut-off edges, and in that the primary elementary bundles are partially overlapped and arranged with respect to one another in the same orientation, so that their first cut-off edges are substantially aligned along a substantially horizontal direction and their second cut-off edges are offset angularly in pairs by a first interval along the substantially horizontal direction.

In a particularly advantageous embodiment, the light beam also produces, in the plane perpendicular to the optical axis, a secondary light bundle similar to the primary light bundle, each secondary elementary bundle of the secondary light bundle being positioned in an inverted orientation relative to a primary elementary bundle, so that their first cut-off edges are substantially aligned along the substantially horizontal direction, and their second cut-off edges are substantially aligned along a substantially vertical direction.

These and other objects and advantages of the invention will be apparent from the following description, the accompanying drawings and the appended claims.

The invention and the advantages that it provides will be more apparent from a reading of the following detailed description of non-limiting exemplary embodiments of the invention, given with reference to the attached drawings, in which:

BRIEF DESCRIPTION OF THE ACCOMPANYING DRAWINGS

DETAILED DESCRIPTION OF THE PREFERRED EMBODIMENTS

Figure 1A:
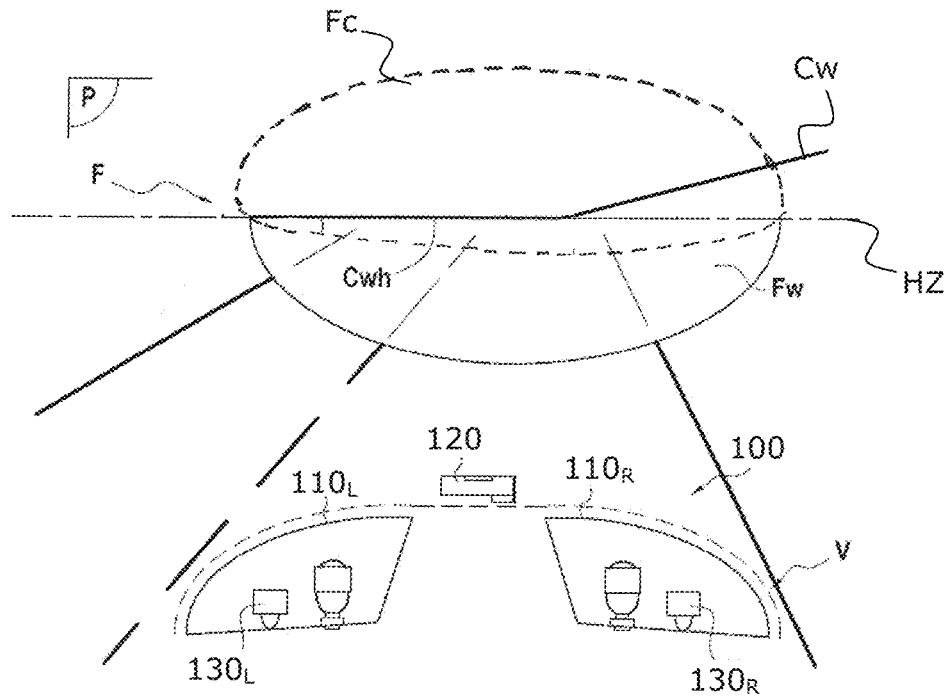
FIGS. 1a and 1b show, schematically and partially, a road scene and the embodiment of an example of the invention, in high beam mode and in ADB mode respectively.
Figure 1B:
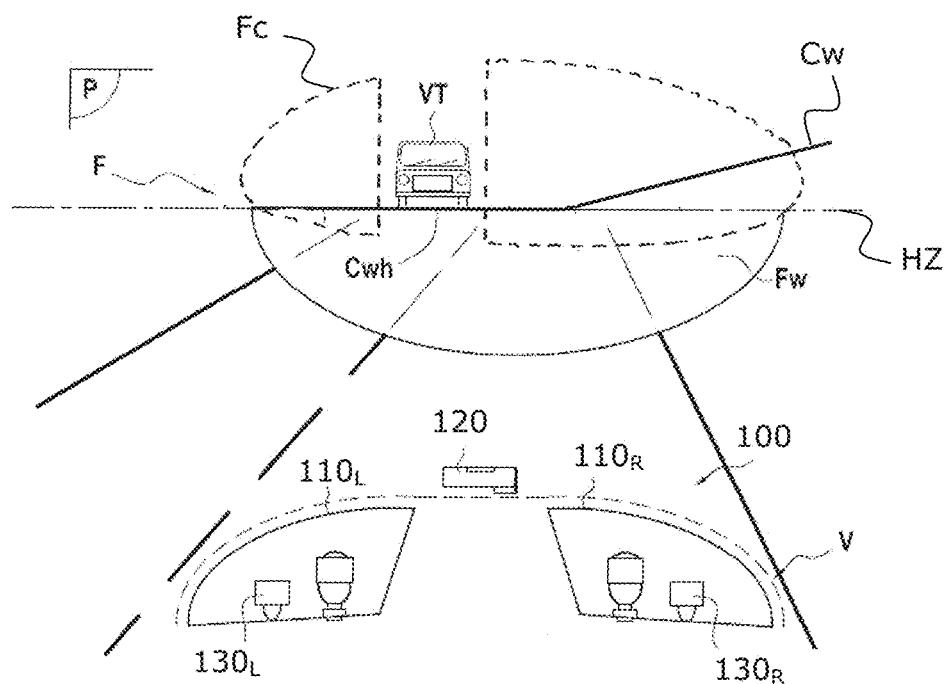

FIGS. 1a and 1b show a road scene using an example of the invention, relating to the driving of a left-hand drive vehicle. The principles explained below are evidently applicable to the driving of a right-hand drive vehicle.

These figures show more precisely, by way of non-limiting example, a lighting system 100 for a motor vehicle V, for providing the ADB function and the high beam function, the system comprising:

a first projector $110_R$ arranged for mounting on the right side of the vehicle V, and a second projector $110_L$ arranged for mounting on the left side of the vehicle V.

The vehicle V is equipped with a camera 120, placed in front for example, for detecting the presence of a third-party vehicle VT traveling in the opposite direction on the opposite (left-hand) carriageway, together with its position (vertical and horizontal).

The two figures show the trace of the overall light beam F obtained in a plane P perpendicular to the general optical axis of the system:

on the one hand, when no third-party vehicle VT is present on the road (the case of FIG. 1a);

on the other hand, when a third-party vehicle VT appears opposite the vehicle V (the case of FIG. 1b).

In both of these examples, the resulting overall beam F corresponds to the overlapping of an oblique cut-off beam Fw of the low beam type, with a horizontal cut-off edge Cwh and a cut-off edge Cw inclined, at 15° for example, with respect to the horizontal HZ, and a complementary beam Fc, the shape of whose trace on the plane P is shown in broken lines.

In the case of FIG. 1a, the shape of the complementary beam Fc enables a high beam F to be provided. As explained more fully below, the lower part of this complementary beam Fc is substantially aligned with the horizontal HZ, but preferably slightly below.

Conversely, as soon as the camera 120 has detected the presence of a third-party vehicle VT, the shape of the complementary beam Fc is modified to allow the generation of a dark area ZS in which the oncoming third-party vehicle VT is located, so as to prevent the dazzling of the driver of the third-party vehicle VT, while illuminating the larger part of the road surface.

According to the invention, the complementary beam Fc corresponds to the overlapping of a first light beam generated by an optical device $130_L$ incorporated into the left-hand projector $110_L$ and a second light beam generated by an optical device $130_R$ incorporated in the right-hand projector $110_R$, these first and second beams being obtainable in different ways which are detailed below.

Figure 2:
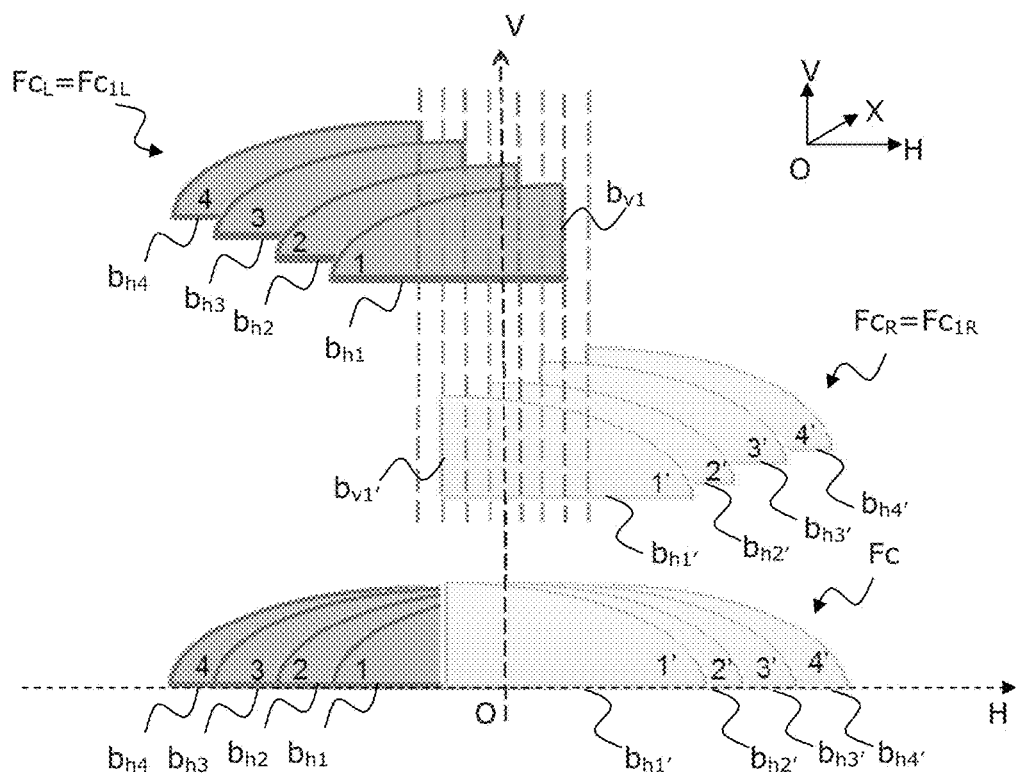
FIG. 2 shows the general appearance of light bundles produced for the complementary beams of a system according to a first embodiment of the invention.

According to a first embodiment, and with reference to FIG. 2, the traces obtained on a plane P with orthogonal axes OV and OH, perpendicular to the optical axis OX, are shown for a first complementary light beam $Fc_L$ generated at the left-hand projector $110_L$, and for a second complementary light beam $Fc_R$ generated at the right-hand projector $110_R$. To enable the composition of these traces to be understood correctly, the different elements have been deliberately offset along the axis OV. In reality, all the elements are overlapped along the same vertical spread, so as to create a total beam Fc on either side of an optical axis OX, the projection of which on the plane P is shown on the last line of FIG. 2.

In the illustrated example, each first and second complementary beam $Fc_L$, $Fc_R$ produces, in the plane P, a primary light bundle $Fc_{1L}$, $Fc_{1R}$, the primary light bundle $Fc_{1L}$ of the first beam $Fc_L$ extending for the most part on a first side of the optical axis OX (toward the left in the example), and the primary light bundle $Fc_{1R}$ of the second beam $Fc_R$ extending for the most part on a second side of the optical axis OX, opposite the first side (toward the right in the example).

The primary light bundle $Fc_{1L}$ projected to the left comprises a plurality of primary elementary bundles, which in the example are four substantially identical elementary bundles, numbered from 1 to 4. Similarly, the primary light bundle $Fc_{1R}$ projected to the right comprises a plurality of primary elementary bundles, which in the example are four substantially identical elementary bundles, numbered from 1' to 4'.

Each elementary bundle numbered i, where the integer i varies from 1 to 4, has a profile in the form of a "ship's sail", delimited by a first cut-off edge $b_{hi}$ and a second cut-off edge $b_{vi}$, forming between them an angle substantially in the range from 70° to 110°, preferably a right angle. Each elementary bundle numbered i thus extends for the most part in a quarter plane delimited by its first and second cut-off edges $b_{hi}$ and $b_{vi}$.

The primary elementary bundles 1 to 4 (and 1' to 4' respectively) of the primary light bundle $Fc_{1L}$ (and $Fc_{1R}$ respectively) are partially overlapped and arranged with respect to one another in the same orientation, so that their first cut-off edges $b_{hi}$ are substantially aligned along a substantially horizontal direction H and their second cut-off edges $b_{vi}$ are offset angularly in pairs by a first interval along the substantially horizontal direction H.

Thus, when all the elementary bundles are switched on, each primary light bundle also has an overall shape in the form of a ship's sail, with a first vertical cut-off edge ($b_{v1}$ for the bundle $Fc_L$, and $b_{v1'}$ for the bundle $Fc_R$), and a second, horizontal cut-off edge corresponding to the overlapping of the horizontal cut-off edges of its constituent elementary bundles.

Additionally, each primary elementary bundle 1 to 4 of the first light beam $Fc_L$ is positioned in an inverted orientation relative to a primary elementary bundle 1' to 4' of the second light beam $Fc_R$, so that their first cut-off edges are substantially aligned along the substantially horizontal direction H, and their second cut-off edges are offset angularly in pairs by a second interval, smaller than the first interval, along the substantially horizontal direction.

In the example, the elementary bundles 1 to 4 are oriented toward the left, while the elementary bundles 1' to 4' are oriented toward the right, the elementary bundles of the same primary light bundle are offset angularly in pairs by a first interval set at 3°, and the vertical cut-offs of the pairs of bundles (4, 1'), (3, 2'), (2, 3') and (1, 4') are offset by a second interval set at 1.5°, that is to say half of the first interval.

Since each primary elementary bundle of the first and second light beams $Fc_L$, $Fc_R$ is produced by a separate light source which can be switched on or off selectively, the arrangement described above enables the space to be discretized into nine areas with a minimum angular size of 1.5°. Thus, in ADB mode, it is possible to create one or more dark areas ZS, each delimited by two vertical cut-off edges produced by each of the light beams $Fc_L$, $Fc_R$. Table 1 below shows, by way of example, crosses which indicate the primary elementary bundles that must be switched off to produce nine dark areas having angular sizes which are equal to or multiples of 1.5° along the horizontal:

TABLE 1

| | LEFT-HAND PROJECTOR Primary bundle | | | | RIGHT-HAND PROJECTOR Primary bundle | | | |
|---|---|---|---|---|---|---|---|---|
| | 1 | 2 | 3 | 4 | 1' | 2' | 3' | 4' |
| Area 1 | X | X | X | X | | | | |
| Area 2 | X | X | X | | | | | |
| Area 3 | X | X | X | | X | | | |
| Area 4 | X | X | | | X | | | |
| Area 5 | X | X | | | X | X | | |
| Area 6 | X | | | | X | X | | |
| Area 7 | X | | | | X | X | X | |
| Area 8 | | | | | X | X | X | |
| Area 9 | | | | | X | X | X | X |

Thus the area 2, produced when the light sources associated with the elementary bundles 1, 2 and 3 are switched off, corresponds to a dark band delimited by the vertical cut-off edges $b_{v4}$ and $b_{v1'}$ of the bundles 4 and 1', respectively;

and the horizontal cut-off edge Cwh of the low beam (FIG. 1a).

The size of the dark areas can thus vary by intervals of 1.5°, and can be moved to follow the movement of the third-party vehicle VT detected by the camera 120.

Because of the shape of the elementary bundles in the form of a ship's sail, the dark areas created in this way do not encroach downward into the low beam during operation in ADB mode. For the same reasons, when all the light sources are switched on, a uniform high beam is obtained, in which no light falling on the ground is produced by the complementary beams.

Different embodiments may be devised for the purpose of producing the elementary bundles shaped in the form of ship's sails:

Thus, each elementary bundle may be generated according to the teachings of the document EP 2 436 968, incorporated by reference, by a light-emitting device comprising:

a reflector, preferably of ellipsoid shape;

a light source, preferably a light-emitting diode;

a shield surface arranged to create a cut-off in a substantially vertical direction in the light beam generated by the light-emitting device;

another shield surface arranged to create a cut-off in a substantially horizontal direction in the light beam generated by the light-emitting device;

an optical element, typically a lens, comprising a first focus and/or a first focal line located at the intersection of the cut-off edges of the two shields, and receiving the light reflected by the reflector.

In a variant, according to the document EP 2 415 638, also incorporated by reference, each elementary bundle can be generated by an optical unit comprising:

a light source, preferably a light-emitting diode, notably a rectangular light emitter, preferably placed in a substantially horizontal plane;

a reflector capable of producing the two substantially orthogonal cut-off edges by direct imaging of the light source, that is to say by aligning the images of the light source formed at each point of the reflector.

One of the sides of the light emitter, for example the larger side of the rectangle, is placed substantially parallel to the optical axis of the reflector. The reflector is preferably composed of two reflective sectors having different geometrical shapes, namely:

a first sector in the form of a paraboloid focused on one of the corners of the rectangular emitter and cut off on a plane comprising one edge of the emitter, or having a complex surface;

a second sector with a complex surface, for generating the horizontal cut-off edge.

This variant embodiment provides cut-off edges which are slightly less sharp than in the case of document EP 2 436 968, although this is not troublesome, but is even desirable for the purpose of obtaining better merging between the low beam and the complementary beam.

Figure 3:
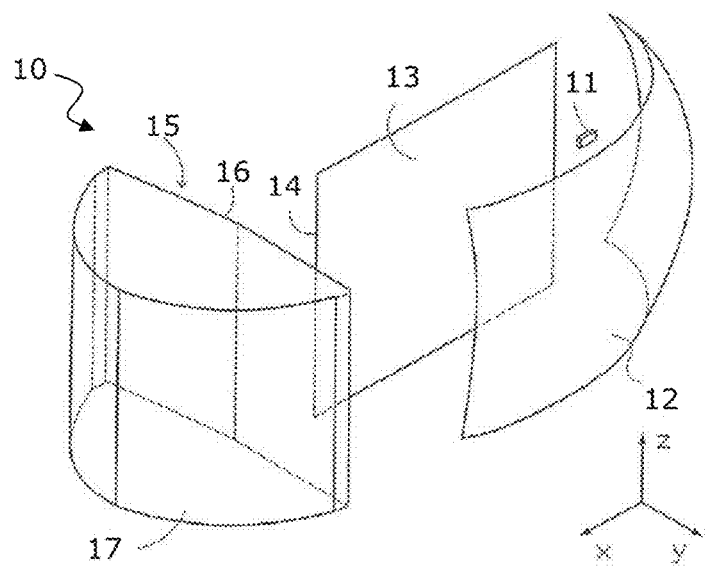
FIG. 3 shows an example of an optical device capable of generating an elementary light bundle in the form of a ship's sail.

According to a third preferred embodiment, each elementary bundle is produced by means of an optical device 10 such as that shown in FIG. 3, and described in detail in the document EP 2 597 360, also incorporated by reference. This device 10 comprises a light source 11 advantageously configured to emit light rays substantially toward the side, with an average direction oriented along an axis y in the orthogonal reference frame illustrated by way of example in FIG. 3. The light source 11 may consist of one or more individual sources, and more particularly one or more light-emitting diodes. If a plurality of diodes are used, it is advantageous to position them in the same plane, which may be, but is not necessarily, oriented vertically.

In the illustrated example, the light source 11 consists of a single LED, having a plurality of semiconductor elements for example, positioned at a first focus of a reflector 12 having a substantially elliptical horizontal cross section, transversely to the reflector 12 and in a vertical plane with an orientation such that its emission is directed toward the facing side of the reflector 12. In the plane of the second cut-off, the axis of the reflector 12 is more particularly defined by the line of the geometric foci located on the major axis of the ellipse, a part of which serves as a generatrix for the construction of the reflector 12. For a light source in the form of a rectangular light emitter, this reflector axis is also aligned with a straight horizontal upper edge of the emitter. The device 10 further comprises a shield wall 13 with an edge 14 at which some of the luminous flux reflected by the reflector 12 is intercepted, and an output beam projection element, in the form of a lens 15 in this case. The shield wall 13, which participates in the creation of the vertical cut-off edge because of its boundary 14, is oriented on a vertical plane. To avoid losses, the shield wall 13 advantageously acts as a beam bender and therefore has a reflective surface in its area where light is reflected by the reflector 12. The various elements are arranged in relation to one another in such a way that some of the emitted light reaches the projection element directly via the reflector 12 and some of the light reaches it indirectly after second reflection from the shield wall 13. To achieve this, the light source 11 is preferably placed in the plane of the shield wall 13 so as to be located facing the reflector 12 and so as to emit with an average ray perpendicular to the shield wall 13 and to the optical axis of the lens 15. The rays passing out of the assembly formed by the light source 11, the reflector 12 and the shield wall 13 enter the lens 15 through its rear face 16 and leave through its front face 17. The lens 15 interacts with the shield wall 13 and the reflector 12 to generate the desired spread of the output beam along the first cut-off plane. The lens 15 images the boundary 14 at infinity, the boundary being advantageously placed in the object focal plane of the lens 15. Along the other cut-off plane, the lens 15 advantageously has no optical power. This is because the second cut-off edge of the elementary bundle is produced by the reflector 12, the shape of which ensures that the rays which it reflects do not travel beyond the first cut-off plane.

The advantage of this embodiment is, notably, that the resulting horizontal cut-off edge can be more fuzzy, and can merge in more satisfactorily in its overlapping with the low beam. This results in greater uniformity of the overall beam. Additionally, the fact that the shield wall 13 can act as a beam bender enables the overall light output to be improved. In a variant, the projection element in the form of the cylindrical lens 15 can be replaced by a secondary reflector whose surface is advantageously that of a portion of a parabolic cylinder with a vertical axis. The rays reflected by the reflector 12 are reflected again by the secondary reflector, so that the axis of emission of the light leaving the optical device can be inclined.

Figure 4:
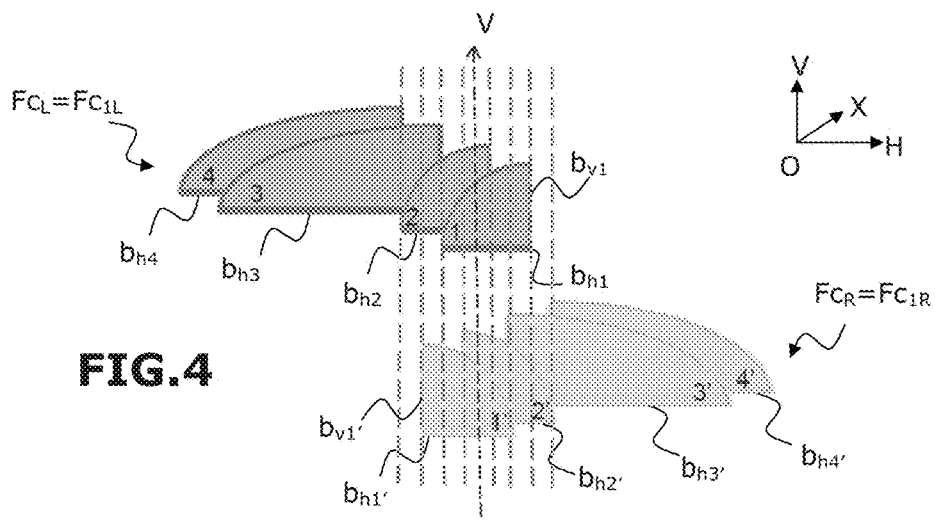
FIG. 4 shows the general appearance of light bundles produced for the complementary beams of a system according to a variant of the system according to the first embodiment of the invention.

In the embodiment of FIG. 2, all the elementary bundles are substantially of the same size. In a variant embodiment shown in FIG. 4, provision is advantageously made to use shapes in the form of ship's sails with a horizontal extension which is variable according to the position of the elementary bundle relative to the optical axis. In the illustrated example, the primary bundle $Fc_{1L}$ produced by the left-hand projector is composed, as in the case of FIG. 2, of four elementary bundles numbered 1 to 4, with its vertical cut-off farthest to the right corresponding to the cut-off edge $b_{v1}$ of the elementary bundle 1. However, only the elementary bundles 3 and 4, that is to say the two elementary bundles whose vertical cut-off edges are the farthest from the vertical cut-off of the primary bundle $Fc_{1L}$ have an identical angular extension, whereas the other two elementary bundles 1 and 2 have a narrower extension. The lengths of the cut-off edges along the horizontal depend on the total number of elementary bundles and the value given to the first interval, and are chosen so as to provide a sufficient lateral extension. The cut-off edges $b_{h3}$, $b_{h4}$ are preferably at least twice as long as the cut-off edges $b_{h1}$, $b_{h2}$. The usefulness of this disparity between the widths of the elementary bundles lies in the fact that fewer variations occur in the position of the peak intensity in the overall beam produced when light sources are selectively switched off to move from one dark area to another.

The performance in terms of uniformity may be improved even more by means of the second embodiment according to the invention, which will now be described with reference to FIGS. 5 and 6.

Figure 5:
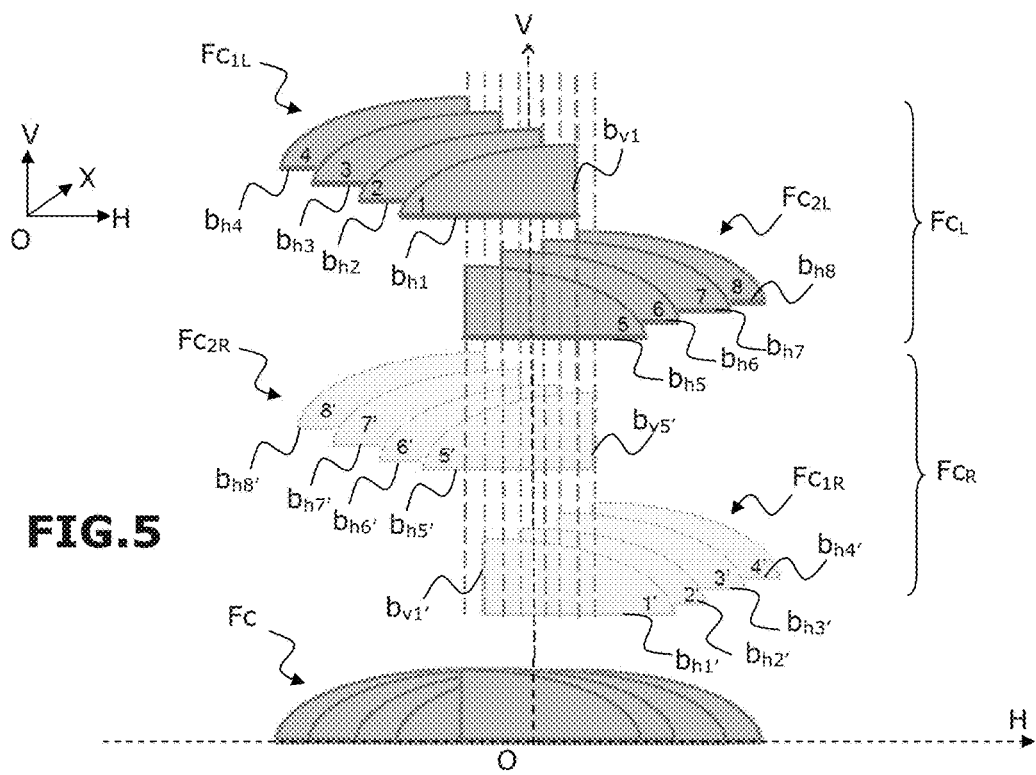
FIG. 5 shows the general appearance of light bundles produced for the complementary beams of a system according to a second embodiment of the invention.

With initial reference to FIG. 5, and following the example of FIG. 2, the traces obtained on a plane P with orthogonal axes OV and OH, perpendicular to the optical axis OX, are shown for a first complementary light beam $Fc_L$ generated at the left-hand projector $110_L$, and for a second complementary light beam $Fc_R$ generated at the right-hand projector $110_R$. Here again, to enable the composition of these traces to be understood correctly, the different elements have been deliberately offset along the axis OV. In reality, all the elements are overlapped along the same vertical spread, so as to create a total beam Fc on either side of an optical axis OX, the projection of which on the plane P is shown on the last line of FIG. 5.

The figures show, with the same references as in the case of FIG. 2, the two complementary beams $Fc_L$ and $Fc_R$, each of which produces a primary bundle $Fc_{1L}$ and $Fc_{1R}$. The composition of these primary bundles and their respective arrangements are identical in all respects to those described with reference to FIG. 2. However, each of these complementary beams $Fc_L$ and $Fc_R$ also produces, in the plane P, a secondary bundle denoted $Fc_{2L}$ for the left-hand projector and $Fc_{2R}$ for the right-hand projector. Each secondary light bundle $Fc_{2L}$ (or $Fc_{2R}$ respectively) is similar to the primary light bundle $Fc_{1L}$ (or $Fc_{1R}$ respectively), except in respect of the orientation of the elementary bundles called secondary bundles, which is inverted relative to the orientation in which the primary elementary bundles of the same beam extend.

Thus, whereas the elementary bundles 1 to 4 for the left-hand projector $110_L$ extend toward the left in the example, the secondary bundle $Fc_{2L}$ comprises four elementary bundles numbered 5 to 8 which extend toward the right. Similarly, whereas the elementary bundles 1' to 4' for the right-hand projector $110_R$ extend toward the right in the example, the secondary bundle $Fc_{2R}$ comprises four elementary bundles numbered 5' to 8' which extend toward the left.

Additionally, each secondary elementary bundle 5 to 8 of the first light beam $Fc_L$ is positioned relative to a primary elementary bundle 1 to 4 of the same light beam $Fc_L$, so that their first cut-off edges are substantially aligned along the substantially horizontal direction H, and their second cut-off edges are substantially aligned along a substantially vertical direction V. Thus, in the example, the vertical cut-off edges for the pairs of elementary bundles (4, 5), (3, 6), (2, 7) and (1, 8) are overlapped in pairs.

Similarly, each secondary elementary bundle 5' to 8' of the second light beam $Fc_R$ is positioned relative to a primary elementary bundle 1' to 4' of the same light beam $Fc_R$ so that their first cut-off edges are substantially aligned along the substantially horizontal direction H, and their second cut-off edges are substantially aligned along a substantially vertical direction V. Thus, in the example, the vertical cut-off edges for the pairs of elementary bundles (4', 5'), (3', 6'), (2', 7') and (1', 8') are overlapped in pairs.

Since each primary and secondary elementary bundle of the first and second light beams $Fc_L$, $Fc_R$ is produced by a separate light source which can be switched on or off selectively, the arrangement described above enables the space to be discretized into nine areas with a minimum angular size of 1.5°. Thus, in ADB mode, it is possible to create one or more dark areas ZS, each delimited by two vertical cut-off edges produced by each of the light beams $Fc_L$, $Fc_R$. Table 2 below shows, by way of example, crosses which indicate the primary and/or secondary elementary bundles that must be switched off to produce nine dark areas having angular sizes which are equal to or multiples of 1.5° along the horizontal:

TABLE 2

| | LEFT-HAND PROJECTOR | | | | | | | | RIGHT-HAND PROJECTOR | | | | | | | |
|---|---|---|---|---|---|---|---|---|---|---|---|---|---|---|---|---|
| | Primary bundle | | | | Secondary bundle | | | | Primary bundle | | | | Secondary bundle | | | |
| | 1 | 2 | 3 | 4 | 5 | 6 | 7 | 8 | 1' | 2' | 3' | 4' | 5' | 6' | 7' | 8' |
| Area 1 | X | X | X | X | | | | | | | | | X | X | X | X |
| Area 2 | X | X | X | | X | | | | | | | | X | X | X | X |
| Area 3 | X | X | X | | X | | | | X | | | | X | X | X | |
| Area 4 | X | X | | | X | X | | | X | | | | X | X | X | |
| Area 5 | X | X | | | X | X | | | X | X | | | X | X | | |
| Area 6 | X | | | | X | X | X | | X | X | | | X | X | | |
| Area 7 | X | | | | X | X | X | | X | X | X | | X | | | |
| Area 8 | | | | | X | X | X | X | X | X | X | | X | | | |
| Area 9 | | | | | X | X | X | X | X | X | X | X | | | | |

Figure 6:
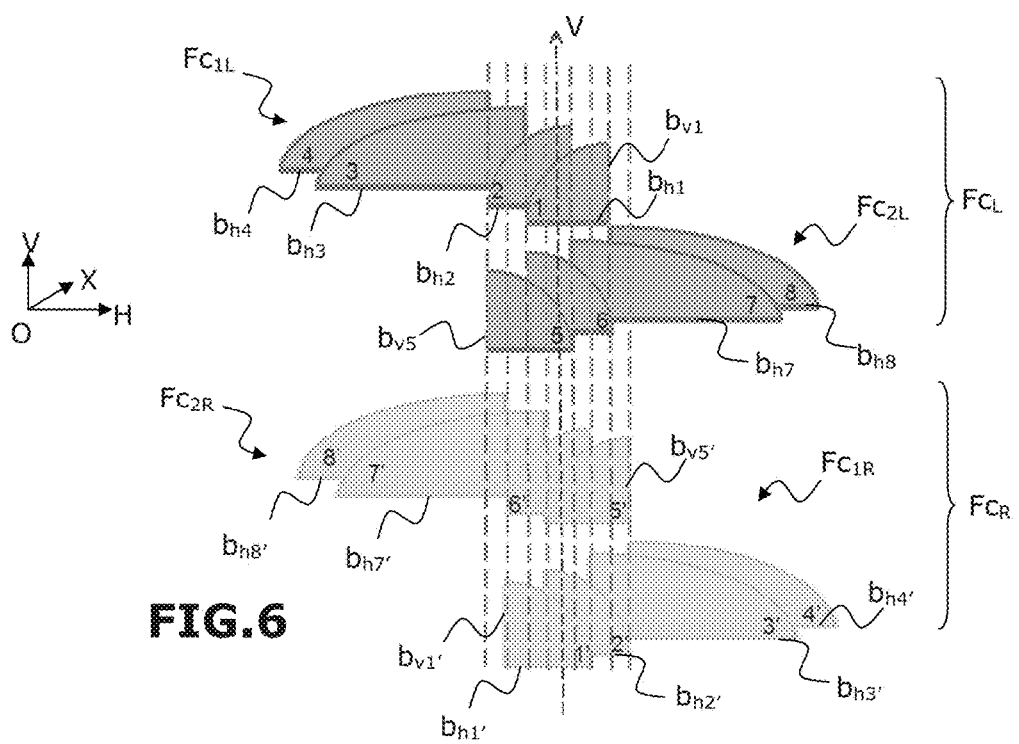
FIG. 6 shows the general appearance of the light bundles produced for the complementary beams of a system according to a variant of the system according to the second embodiment of the invention.

FIG. 6 shows a variant of this second embodiment, wherein the elementary bundles 1, 2, 5, 6 for the first complementary beam Fc$_L$, and 1', 2', 5', 6' for the second complementary beam Fc$_R$ have a smaller angular extension than the set of the other elementary bundles. As explained above, the fact that the elementary bundles have widths increasing with distance from the vertical cut-off of the elementary bundle in question makes it possible to provide greater stability of the position of the peak intensity in the overall beam produced when the light sources are selectively switched off to move from one dark area to another.

In both cases, in addition to the aforementioned advantages for the first embodiment, very high uniformity of the overall beam is obtained, regardless of the distance relative to the vehicle at which the user is placed, because the beam obtained at each projector is itself highly uniform.

Moreover, by contrast with the first embodiment, the dark areas with variable sizes and positions can be produced by a single projector, between two vertical cut-off edges. Admittedly, in this case, the minimum angular extension is 3°, but the offset of 1.5° between the elementary bundles of the two headlights enables the resolution to be doubled.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

The invention claimed is:

1. A lighting device comprising:
a projector to project, on a plane perpendicular to an optical axis, a light beam with at least a primary light bundle comprising a plurality of primary elementary bundles, each of said plurality of primary elementary bundles being generated by a light source configured to be switched on or off selectively, wherein
each of said plurality of primary elementary bundles comprises a first and a second cut-off edge, and extends substantially in a quarter plane delimited by said first and second cut-off edges, and
said plurality of primary elementary bundles partially overlapping and arranged with respect to one another along a same orientation, so that their first cut-off edges are substantially aligned along a substantially horizontal direction and their second cut-off edges are offset angularly in pairs by a first interval along said substantially horizontal direction.

2. The lighting projector as claimed in claim 1, wherein said light beam comprises a secondary light bundle comprising a plurality of secondary elementary bundles positioned in a horizontally flipped orientation relative to said plurality of primary elementary bundles, so that their first cut-off edges are substantially aligned along said substantially horizontal direction, and their second cut-off edges are substantially aligned along a substantially vertical direction.

3. A lighting system comprising:
a first projector to project a first light beam; and
a second projector to project a second light beam,
the first and second light beams being combined to create a total beam on either side of an optical axis,
each first and second light beam comprising at least one primary light bundle extending in a plane perpendicular to the optical axis,
each of said at least one primary light bundle comprising a plurality of primary elementary bundles, each comprising a first and a second cut-off edge, and each extending substantially in a quarter plane delimited by said first and said second cut-off edges,
said plurality of primary elementary bundles of a same primary light bundle partially overlapping and arranged with respect to one another along a same orientation, so that their first cut-off edges are substantially aligned along a substantially horizontal direction and their second cut-off edges are offset angularly in pairs by a first interval along said substantially horizontal direction,
each of said plurality of primary elementary bundles of said first light beam being positioned in a horizontally flipped orientation relative to a primary elementary bundle of said second light beam, so that said first cut-off edges of said plurality of primary elementary bundles of said first light beam and of said plurality of primary elementary bundles of said second light beam are substantially aligned along said substantially horizontal direction, and said second cut-off edges of said plurality of primary elementary bundles of said first light beam and of said second light beam are offset angularly in pairs by a second interval, smaller than said first interval, along said substantially horizontal direction, and
each of said plurality of primary elementary bundles of said first and second light beams being generated by a light source configured to be switched on or off selectively.

4. The lighting system as claimed in claim 3, wherein said second interval is substantially equal to half of said first interval.

5. The lighting system as claimed in claim 3, wherein said first interval is defined by an angle formed between each of the corresponding second cut-off edges and a point of the light source on the optical axis, and said angle is set at about 3 degrees.

6. The lighting system as claimed in claim 3, wherein said plurality of primary elementary bundles of a same light bundle are of substantially a same size.

7. The lighting system as claimed in claim 3, wherein said total beam produced is a beam complementary to a cut-off beam to provide a high beam.

8. The lighting system as claimed in claim 3, wherein said first and second cut-off edges of each of said plurality of primary elementary bundles form an angle substantially in the range from 70° to 110°.

9. The lighting system as claimed in claim 3, wherein said plurality of primary elementary bundles of a same light bundle have an angular extension, in horizontal direction, which is variable according to their position in a light bundle.

10. The lighting system as claimed in claim 9, wherein said angular extension of said plurality of primary elementary bundles of a same light bundle increases with the distance between a first vertical cut-off edge associated with each elementary bundle and a vertical cut-off edge of a same said light bundle when all the associated light sources are switched on.

11. The lighting system as claimed in claim 10, wherein said light sources are light-emitting diodes.

12. The lighting system as claimed in claim 3, wherein each elementary bundle is produced by an optical device comprising:
   a reflector arranged to generate a reflected light beam based on light rays emitted by a light source associated with said elementary bundle; and
   a shield wall having a boundary located on the path of said reflected light beam and configured to form said second cut-off edge, said reflector being arranged to generate said first cut-off edge.

13. The lighting system as claimed in claim 12, wherein said reflector has a substantially elliptical horizontal cross section, and said associated light source is placed in a plane of said shield wall at a first focus of said substantially elliptical horizontal cross section.

14. The lighting system as claimed in claim 12, wherein said shield wall is reflective.

15. The lighting system as claimed in claim 14, wherein said reflector has a substantially elliptical horizontal cross section, and said associated light source is placed in a plane of said shield wall at a first focus of said substantially elliptical horizontal cross section.

16. The lighting system as claimed in claim 3, wherein each of said first and second light beams also comprises a secondary light bundle comprising secondary elementary bundles which extend, in a same beam, in an orientation opposed to that of said primary light bundle.

17. The lighting system as claimed in claim 16, wherein said second interval is substantially equal to half of said first interval.

18. The lighting system as claimed in claim 16, wherein said first interval is defined by an angle formed between each of the corresponding second cut-off edges and a point of the light source on the optical axis, and said angle is set at about 3 degrees.

19. The lighting system as claimed in claim 16, wherein each secondary elementary bundle of said first and second light beam is horizontally flipped relative to respective primary elementary bundle, so that their first cut-off edges are substantially aligned along said substantially horizontal direction, and their second cut-off edges are substantially aligned along a substantially vertical direction.

20. The lighting system as claimed in claim 19, wherein said second interval is substantially equal to half of said first interval.

21. The lighting system as claimed in claim 19, wherein said first interval is defined by an angle formed between each of the corresponding second cut-off edges and a point of the light source on the optical axis, and said angle is set at about 3 degrees.

* * * * *